United States Patent [19]

Bishop

[11] Patent Number: 5,219,006
[45] Date of Patent: Jun. 15, 1993

[54] METHOD AND APPARATUS FOR A STRAINER FUNNEL WITH SUPPORT MEANS

[76] Inventor: Bonnie L. Bishop, R.R. #2, Box 135E, Rome, Pa. 18837

[21] Appl. No.: 839,924

[22] Filed: Feb. 21, 1992

[51] Int. Cl.⁵ .................................... B67C 11/02
[52] U.S. Cl. ............................ 141/1; 141/331; 141/340; 141/363; 141/369; 141/375; 141/286; 210/513
[58] Field of Search ............ 141/286, 297-300, 141/309, 310, 331, 340-342, 363-366, 369, 375; 210/799, 800, 513, 514

[56] References Cited

U.S. PATENT DOCUMENTS

| | | | |
|---|---|---|---|
| 509,966 | 12/1893 | Strater | 141/340 |
| 542,248 | 7/1895 | Gaudron | 141/331 X |
| 559,905 | 5/1896 | Pile . | |
| 586,377 | 7/1897 | Bossinger | 141/365 X |
| 590,243 | 9/1897 | Smith . | |
| 606,927 | 7/1898 | Keene | 141/342 X |
| 760,069 | 5/1904 | Hunter | 141/340 |
| 892,000 | 6/1908 | MacKaskie | 141/331 UX |
| 934,761 | 9/1909 | Sargent | 141/341 |
| 1,134,837 | 4/1915 | Fox . | |
| 1,170,892 | 2/1916 | Graham . | |
| 1,368,640 | 2/1921 | Melchior | 141/340 |
| 2,083,788 | 6/1937 | Loeber | 141/310 X |
| 2,456,912 | 12/1948 | Burrows . | |
| 2,517,759 | 8/1950 | Bentzen | 141/340 |
| 4,022,257 | 5/1977 | O'Connell | 141/98 |

FOREIGN PATENT DOCUMENTS

| | | | |
|---|---|---|---|
| 432270 | 12/1911 | France | 141/331 |
| 110256 | 8/1924 | Switzerland | 141/331 |
| 248183 | 4/1947 | Switzerland | 141/331 |
| 7869 | of 1902 | United Kingdom | 141/340 |
| 16111 | of 1910 | United Kingdom | 141/341 |
| 166477 | 7/1921 | United Kingdom | 141/331 |
| 176206 | 3/1922 | United Kingdom | 141/340 |
| 428128 | 5/1935 | United Kingdom | 141/310 |

Primary Examiner—Ernest G. Cusick
Attorney, Agent, or Firm—Barnard & Brown

[57] ABSTRACT

The discovery of the present invention includes method and apparatus for a strainer funnel with means for supporting itself over a wide variety of receptacles. The method and apparatus for a new and improved strainer funnel aid a cook in separating liquids from solids. The new and improved strainer funnel of the present invention comprises: a bowl, a strainer, a funnel in the lower portion of the bowl and support means attached to the bowl such that the bowl is adequately supported if placed on a flat surface and on top of a receptacle being used to collect the liquids passing through the funnel. The method includes providing an improved strainer funnel and using it to separate liquids from solids.

14 Claims, 7 Drawing Sheets

METHOD AND APPARATUS FOR A STRAINER FUNNEL WITH SUPPORT MEANS

FIELD OF THE INVENTION

The present invention relates to strainer funnels and more particularly relates to a strainer funnel which includes means for supporting the funnel on a flat surface or on a container for receiving liquid.

BACKGROUND OF THE INVENTION

The need to separate liquids from solids arises frequently in the kitchen. Most of the time, one is merely trying to drain the water from lettuce or pasta where there is no need to save the water. Therefore the lettuce or pasta is placed or poured into a colander in a sink and the water runs down the drain. A problem arises when one is trying to collect the liquid. Combination strainer-funnels have been disclosed in prior patent publications. U.S. Pat. Nos. 559,905, 590,243, 1,134,837, 1,170,892, 2,456,912, 4,022,257 all teach a combined funnel and strainer device, however, none of these devices are self supporting on a variety of receptacles.

Most kitchens have an empty jar around that is used to collect excess grease. When the need arises to drain the grease from a hot pan of meat it is important that both hands be free to control the skillet while the meat and excess grease are both being poured into the strainer. This means that the strainer should be self supporting in its position over the receptacle being used to collect the run off. Furthermore, the strainer must be self supporting over a variety of receptacles such as pots, sink drains, mayonnaise jars or ketchup bottles.

SUMMARY OF THE INVENTION

It is, therefore, the primary object of the present invention to provide a strainer funnel with means for supporting the funnel on a flat surface or on a container for receiving liquid.

It is a further object of the present invention to provide a strainer funnel which includes a balancing disk attached to the bowl such that liquids passing through the funnel pour into the container.

It is a further object of the present invention to provide a strainer funnel which includes legs attached to the bowl such that the bowl will be supported on the mouth of the container by the legs.

The teachings of the present invention include the discovery that a strainer funnel can be provided with means for supporting itself over a wide variety of receptacles. In accordance with the teachings of the present invention, a new and improved strainer funnel is provided to aid a cook in separating liquids from solids. The new and improved strainer funnel of the present invention comprises: a bowl, a strainer, a funnel in the lower portion of the bowl and support means attached to the bowl such that the bowl is adequately supported on either a flat surface or on top of a container being used to collect the liquids passing through the funnel.

The support means can be legs attached to the bowl, extending first in a horizontal direction and then in a vertical direction such that if the bowl is positioned on top of the container the bowl will be supported on the mouth of the container by the portion of the legs extending in a horizontal direction. The support means could also be a balancing disk attached to the bowl such that the funnel extends through the disk and liquids may be collected by positioning the bowl on the container for receiving the liquids so that liquids passing through the funnel pour into the container. The balancing disk may include means for allowing air to escape from the container as liquid flows through the funnel. The advantage of the balancing disk or legs functioning as the support means is that a person in the kitchen can support the funnel-strainer on a variety of large to small mouthed grease catches and have their hands free to drain the liquid from a large pan of food.

A further discovery of the present invention includes a method of separating liquids from solids. The new and improved method comprises: providing a bowl; positioning a strainer inside of the bowl such that solids will not pass through the strainer but liquids will; providing a funnel in the bowl such that the liquids passing through the strainer pass through the funnel; providing support means attached to the bowl such that the bowl is adequately supported on either a flat surface or on top of a container being used to collect the liquids passing through the funnel; positioning the bowl such that the liquids passing through the funnel are received in a selected receptacle; pouring a mixture of solids and liquids into the bowl; and allowing the liquid to flow through the strainer and the funnel such that it is received in the selected receptacle.

The novelty and versatility of this product will be appealing to consumers. The strainer funnel can be used to drain grease into jars, drain liquid from scraps before throwing them away, drain juice or grease from meat for gravy or stock, drain lumps from gravy, drain grease from deep fryer, strain noodles, potatoes, vegetable, fruit rice, ect. The strainer funnel is simple and cleans easily.

These and other objects, features and advantages of the present invention should become apparent from the following description when taken in conjunction with the accompanying drawings.

DETAILED DESCRIPTION OF THE PREFERRED EMBODIMENT

Figure 1:
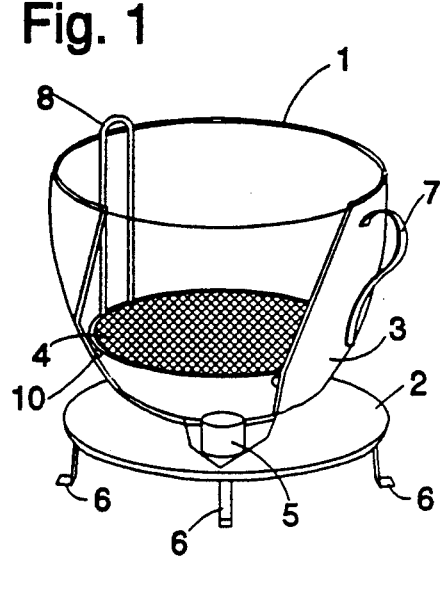
FIG. 1 is a perspective view of a strainer funnel with a balancing disk as the support means of the present invention.

For the purposes of promoting an understanding of the teachings of the present invention, references will now be made to the embodiments illustrated in the drawings and specific language will be used to describe these embodiments. It will nevertheless be understood that no limitation of the scope of the invention is thereby intended, alterations and further applications of the teachings of the present invention as illustrated and described hereinabove is anticipated by those skilled in this art.

The teachings of the present invention include the discovery that a strainer funnel can be provided with means for supporting itself over a wide variety of receptacles. In accordance with the teachings of the present invention, a new and improved strainer funnel is provided to aid a cook in separating liquids from solids.

Referring now to FIG. 1, a perspective view of a strainer funnel 1 with a balancing disk 2 as the support means of the present invention is shown. The new and improved strainer funnel 1 of the present invention comprises: a bowl 3, a strainer 4, a funnel 5 in the lower portion of the bowl 3 and support means 2 attached to the bowl such that the bowl is adequately supported on either a flat surface or on top of a container being used to collect the liquids passing through the funnel 5. The support means are provided by a balancing disk 2 attached to the bowl 3 such that the funnel 5 extends through the disk and liquids may be collected by positioning the bowl 3 on a container for receiving the liquids so that liquids passing through the funnel 5 pour into the container. The balancing disk 2 may include legs 6. The advantage of the balancing disk 2 is that a person in the kitchen can support the funnel-strainer on a variety of medium to small mouthed grease catches or over a sink drain and have their hands free to drain the liquid from a large pan of food.

The strainer 4 inside of the bowl 3 separates the bowl 3 into an upper and lower portion such that a combination of liquids and solids can be placed in the upper portion of the bowl 3 and the liquids will flow thorugh the strainer 4 into the lower portion of the bowl 3 and the solids will remain in the upper portion of the bowl. The funnel 5 in the lower portion of the bowl 3 allows the liquids in the lower portion of the bowl 3 to pass through the funnel 5 and into a receptacle. The support means attached to the bowl 3 allow the bowl 3 to be adequately supported on either a flat surface or on top of a container being used to collect the liquids passing through the funnel 5.

Figure 2:
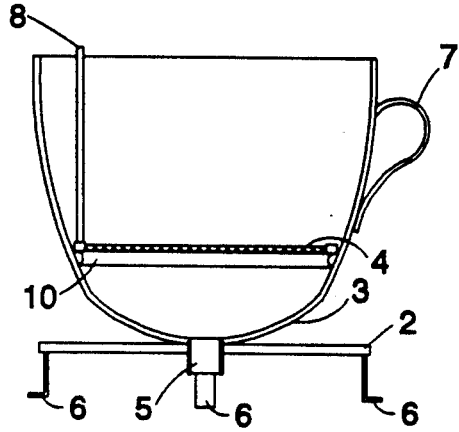
FIG. 2 is a side view of a strainer funnel with support means of the present invention with a side handle and a flat mesh strainer.

FIG. 2 is a side view of a strainer funnel 1 with support means of the present invention with a side handle 7 and a flat mesh strainer 4 including a handle 8. The strainer 4 is removable from the bowl 3 and the bowl 3 includes means for supporting the strainer 4 at a fixed level within the bowl. The strainer 4 includes a handle 8 such that the solids can be removed from the bowl 3 by lifting the strainer 4 out of the bowl. The means for supporting the strainer 4 are shown as a ring 10.

Figure 3:
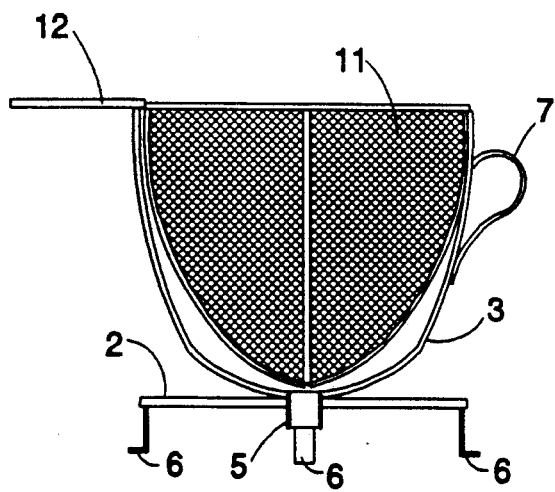
FIG. 3 is a side view of a strainer funnel with support means of the present invention with a side handle and a basket strainer.
Figure 4:
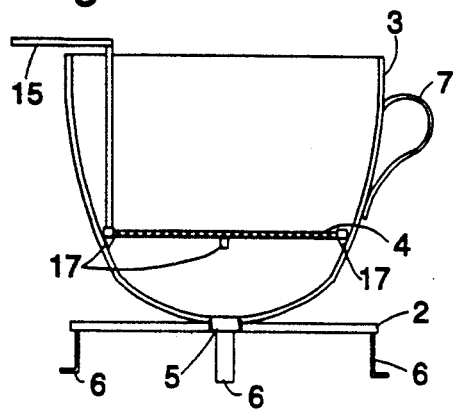
FIG. 4 is a side view of a strainer funnel with support means of the present invention with a side handle and a flat mesh strainer including an extended and turned handle.

FIG. 3 is a side view of a strainer funnel 1 with support means of the present invention with a side handle 7 and a basket strainer 11. The basket strainer 11 is intended to a conventional type basket strainer such that in most of the shown exemplary embodiments conventional basket strainer could be used. The basket strainer 11 also includes a handle 12 for easy handling. FIG. 4 is a side view of a strainer funnel 1 with support means of the present invention with a side handle and a flat mesh strainer 4 including an extended and turned handle 15. The flat mesh strainer 4 is being supported by ridges 17. The use of ridges 17 as opposed to a ring 10 allows for easier cleaning and conserves material needed to form the bowl.

Figure 5:
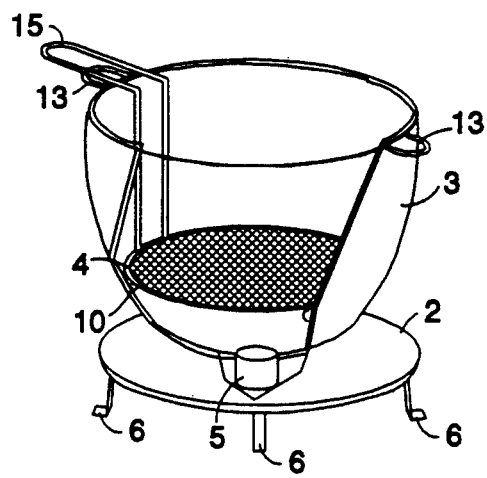
FIG. 5 is a perspective view of a strainer funnel with support means of the present invention with two top handles and a flat mesh strainer including an extended and turned handle.
Figure 6:
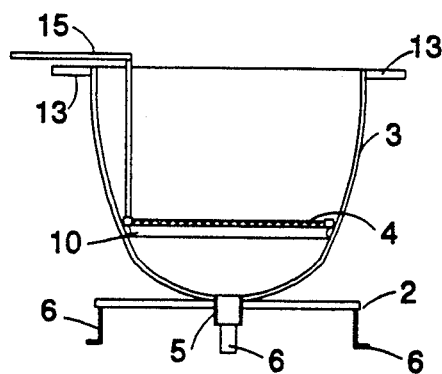
FIG. 6 is a side view of a strainer funnel with support means of the present invention with two top handles and a flat mesh strainer including an extended and turned handle.

FIG. 5 is a perspective view of a strainer funnel 1 with support means of the present invention with two top handles 13 and a flat mesh strainer 4 including an extended and turned handle 15. FIG. 6 is a side view of a strainer funnel 1 with support means of the present invention with two top handles 13 and a flat mesh strainer 4 including an extended and turned handle 15. The choice between two top handles 13 or a side handle 7 should be dictated by intended application. For most light home uses a side handle 7 is believed to be more convenient and easier to balance. However, the side handle 7 would most likely be awkward to handle if an substantial amount of solids are in the bowl 3. So for larger strainer funnels 1 intended for use in commercial kitchens or in larger households, the two top handles 13 would be preferable to make the strainer funnel 1 easier to lift when full.

Figure 7:
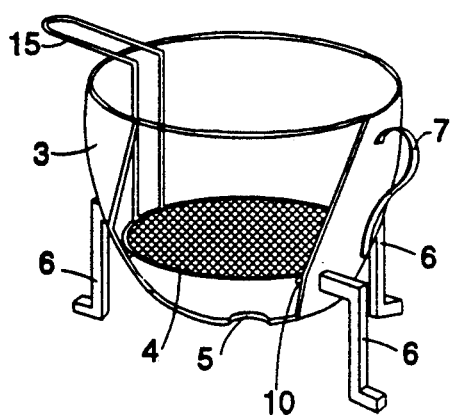
FIG. 7 is a perspective view of a strainer funnel with legs as the support means of the present invention.
Figure 8:
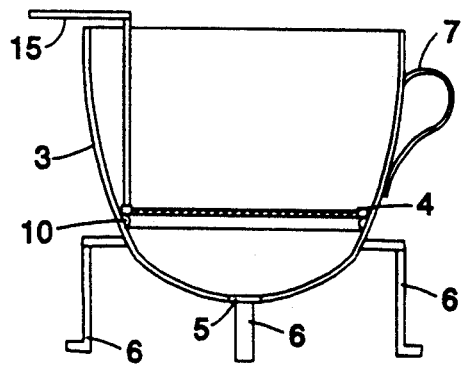
FIG. 8 is a side view of a strainer funnel with legs as the support means of the present invention.

FIG. 7 is a perspective view of a strainer funnel 1 with legs 6 as the support means of the present invention. FIG. 8 is a side view of a strainer funnel 1 with legs 6 as the support means of the present invention. The legs 6 are attached to the bowl 3, and extend first in a horizontal direction and then in a vertical direction such that if the bowl 3 is positioned on top of a container the bowl 3 will be supported by the portion of the legs 6 extending in a horizontal direction. The use of the balancing disk 3 is preferred over the use of legs 6 as the sole means of support because of the great degree of versatility and other advantages of using the balancing disk 2. However, in some specific applications of the teachings of the present invention it may be more desirable to use legs 6 as the sole means of support because the limited space between the bowl 3 and the legs 6 will prevent the strainer funnel from sliding off of a container.

The length of the funnel 5 varies as shown in FIGS. 1-8. It may be desireable to have the funnel 5 be flush with the disk 2 or the bottom of the bowl 3. If the funnel 5 extends beyond the disk 2 it will be easier to properly position the strainer funnel 1. Ultimately, this like many other modifications will be decided upon the intended application in accordance with the teachings of the present invention.

Figure 9:
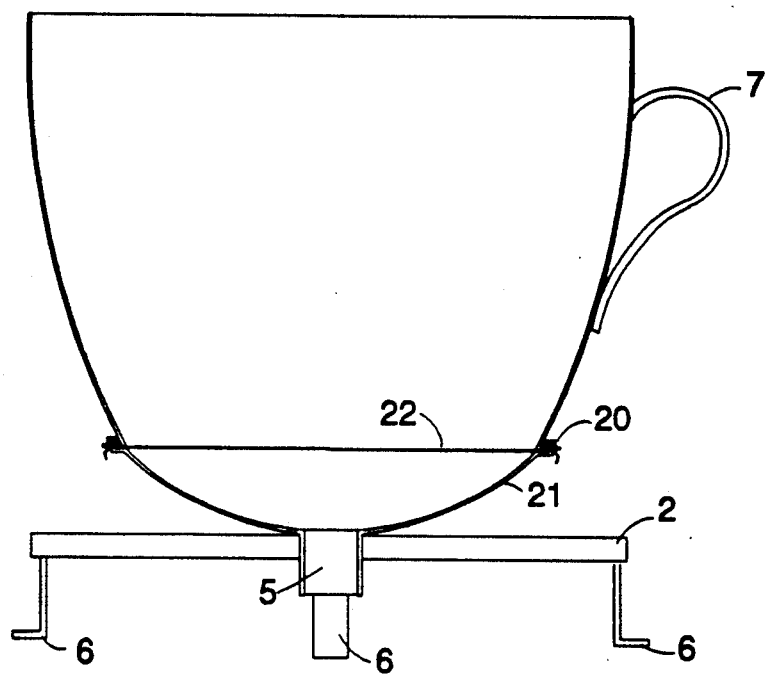
FIG. 9 is a side view of a strainer funnel with support means of the present invention with a side handle and a trapped mesh strainer.
Figure 10:
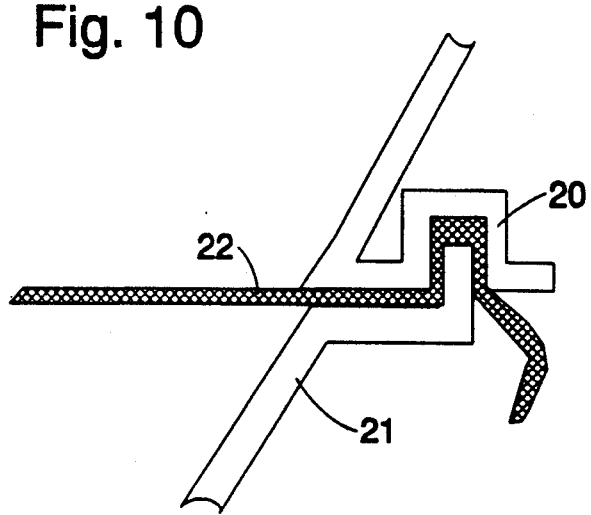
FIG. 10 is a detail view of the trapped mesh strainer for a strainer funnel of the present invention.

FIG. 9 is a side view of a strainer funnel 1 with support means of the present invention with a side handle 7 and a trapped mesh strainer 22. FIG. 10 is a detail view of the trapped mesh strainer 4 for a strainer funnel 1 of the present invention. This type of strainer 22 allows the user to select various mesh sizes and clean the mesh easily. The bowl 3 would be divided into an upper portion 20 and a lower portion 21. The two portions 20 and 21 would attach to one another such that they were secured with the mesh strainer 22. Different types of upper portions 20 could be used with differing lower portions 21 to provide greater variability. By changing the lower portion 21 the funnel 5 sizes could be varied, and by changing the upper portion 20 the capacity for holding solids could be increase or decreased as desired.

Figure 11:
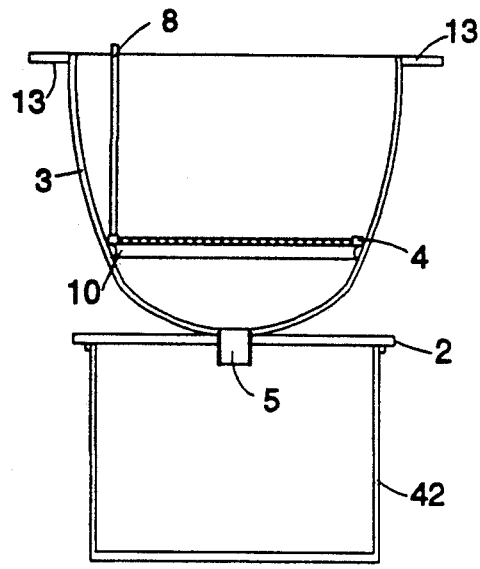
FIG. 11 is a side view of a strainer funnel with support means of the present invention positioned over a cooking pot.
Figure 12:
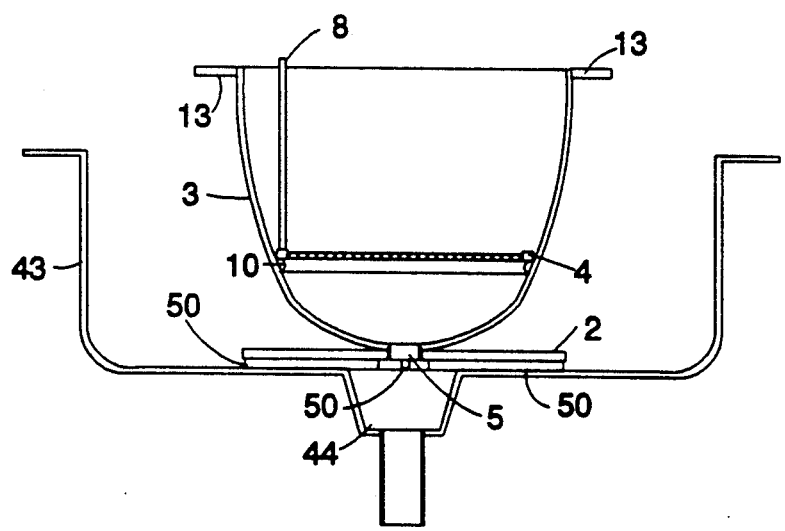
FIG. 12 is a side view of a strainer funnel with support means of the present invention positioned over a sink drain.

FIGS. 11-14 show the strainer funnel of the present invention being used over a variety of receptacles. The embodiment shown in FIGS. 11 and 12 is the preferred embodiment of the present invention for its simplicity and versatility. With the understanding that the various teachings of the present invention will be combined and implemented with the specific needs of each particular application, the embodiment shown in FIGS. 11 and 12 is believed to be the best mode for carrying out the teachings of the present invention.

FIG. 11 is a side view of a strainer funnel 1 with support means of the present invention positioned over a cooking pot. FIG. 12 is a side view of a strainer funnel 1 with support means of the present invention positioned in a sink 43 over a sink drain 44. Please not that any drain, pot, container, etc. intended for receiving the flow of liquid from the funnel 5 is considered to fall within the meaning of the word receptacle as used herein. For example, some kitchens may be comfortable with pouring grease down the sink drain 44 but do not want the hassle of cleaning the sink 43. The grease is prevented from soiling the sink 43 when using the strainer funnel 1 because the flow of the grease is directed to go directly down the drain 44.

Figure 13:
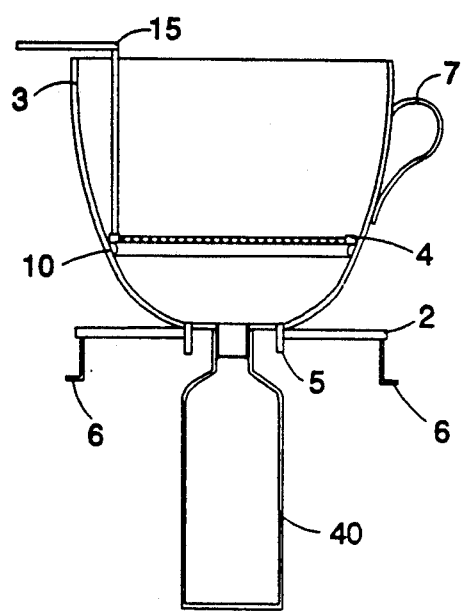
FIG. 13 is a side view of a strainer funnel with support means of the present invention positioned over a small mouthed container.
Figure 14:
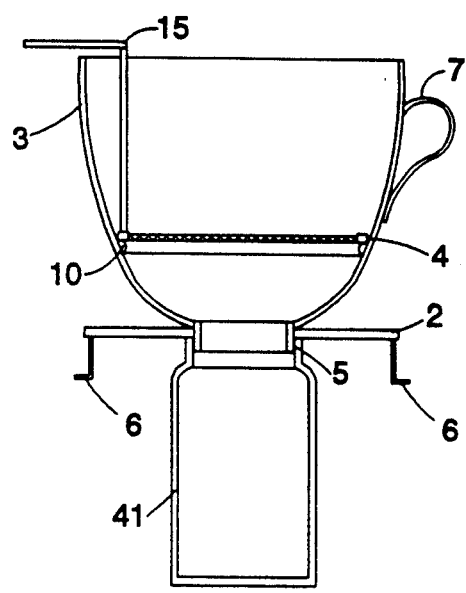
FIG. 14 is a side view of a strainer funnel with support means of the present invention positioned over a medium mouthed container.
Figure 15:
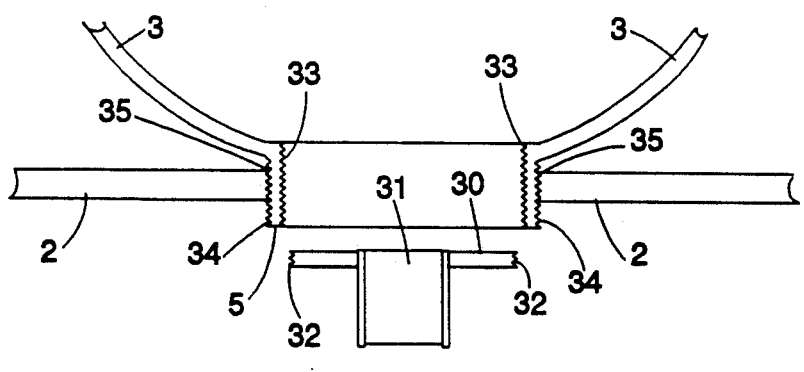
FIG. 15 is a detail view of a strainer funnel with support means of the present invention showing an insert to be fitted within the funnel of the strainer funnel.

FIG. 13 is a side view of a strainer funnel 1 with support means of the present invention positioned over a small mouthed container 40. FIG. 14 is a side view of a strainer funnel 1 with support means of the present invention positioned over a medium mouthed container 41. FIG. 15 is a detail view of a strainer funnel 1 with support means of the present invention showing an insert to be fitted within the funnel 5 of the strainer funnel 1. The funnel 5 includes a removable insert 30 with a narrower funnel 31 such that when the insert 30 is secured in the funnel liquid will flow through the narrower funnel 31 in the insert 30. Threads 32 are provided on the side of the insert 30 and threads 33 for receiving the insert 30 are provided on the inside of the funnel 5. The funnel 5 can include threads 34 and the balancing disk 2 can includes a threaded opening 35 such that the disk 2 is attached to the bowl 3 by screwing the threaded opening of the disk 2 onto the threaded funnel 5. The ability to vary the size of the funnel 5 is very advantageous for use in canning, wherein the "liquid" portion may in fact be a slurry of chunks of fruit and might flow to slowly through a smaller opening. In some applications, a funnel 31 that fits snugly in the mouth of a small mouthed receptacle 40 may be desired and finding the best fit by changing inserts 30 would help support the strainer funnel 1. As opposed to using threads various other means for retention could be employed as known to the those skilled in the art of providing attachments to kitchen utensils, with the intention of minimizing materials, increasing the balance and secureness of the strainer funnel 1 on the receptacle or providing greater variability, etc.

Figure 16A:
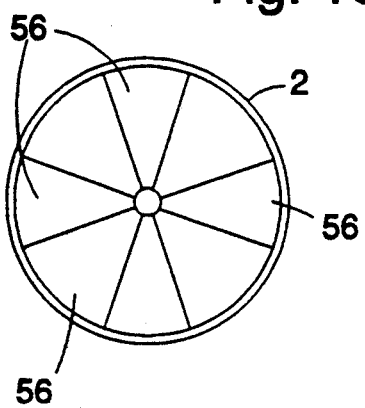
FIGS. 16a and 16b are detail views of a balancing disk support means with slots for a strainer funnel of the present invention.
Figure 16B:
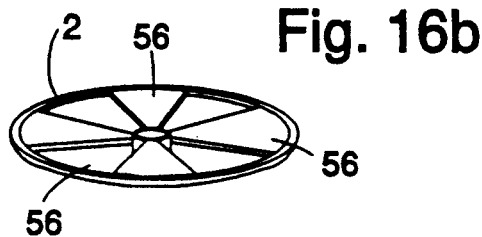
Figure 17:
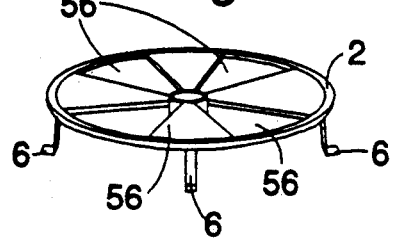
FIG. 17 is a detail view of a balancing disk support means with slots and legs for a strainer funnel of the present invention.
Figure 18:
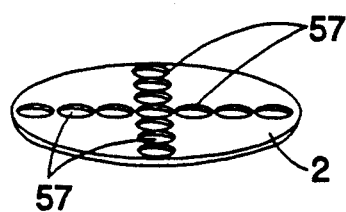
FIG. 18 is detail view of a balancing disk support means with holes for a strainer funnel of the present invention.
Figure 19:
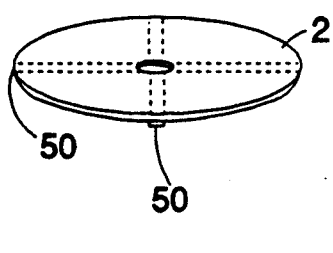
FIG. 19 is detail view of a solid balancing disk support means for a strainer funnel of the present invention.
Figure 20:
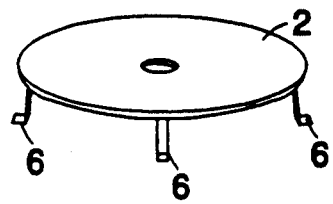
FIG. 20 is detail view of a solid balancing disk support means with legs for a strainer funnel of the present invention.

The balancing disk 2 may include means for allowing air to escape from the container as liquid flows through the funnel 5. FIGS. 16a and 16b are detail views of a balancing disk 2 support means with slots 56 for as strainer funnel 1 of the present invention. FIG. 17 is a detail view of a balancing disk 2 support means with slots 56 and legs 6 for a strainer funnel 1 of the present invention. FIG. 18 is detail view of a balancing disk 2 support means with holes 57 for a strainer funnel 1 of the present invention. FIG. 19 is a detail view of a solid balancing disk 2 support means for a strainer funnel 1 of the present invention including ridges 50 on the bottom of the disk 2 such that only the ridges 50 come into direct contact with the mouth of the receptacle and air can flow between the ridges 50. FIG. 20 is a detail view of a solid balancing disk 2 support means with legs 6 for a strainer funnel 1 of the present invention.

Figure 21A:
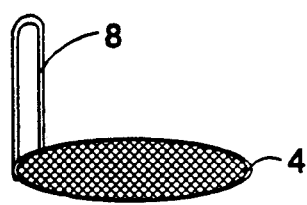
FIGS. 21a, 21b and 21c are detail views of flat mesh strainers for a strainer funnel of the present invention.
Figure 21B:
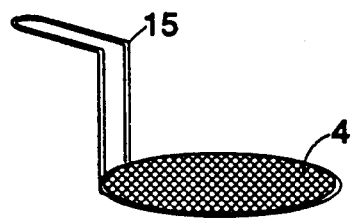
Figure 21C:
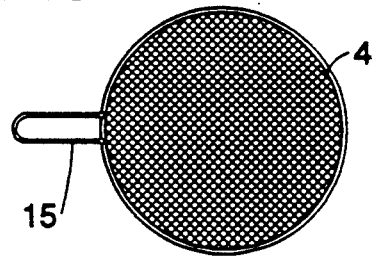
Figure 22A:
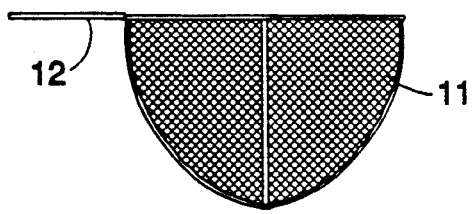
FIGS. 22a and 22b are detail views of basket strainers for a strainer funnel of the present invention.
Figure 22B:
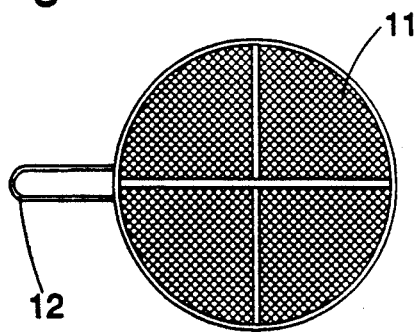
Figure 23A:
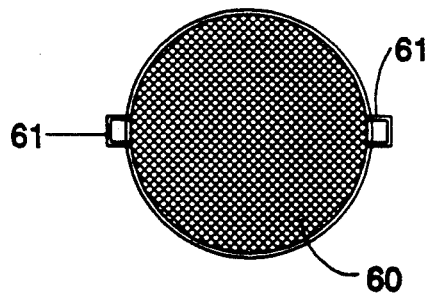
FIGS. 23a and 23b are detail views of flat mesh basket strainers for a strainer funnel of the present invention.
Figure 23B:
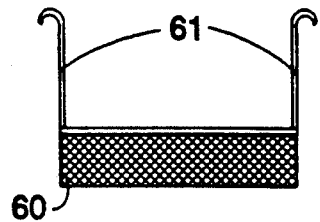

FIGS. 21a, 21b and 21c are detail views of flat mesh strainers 4 for a strainer funnel 1 of the present invention. FIGS. 22a and 22b are detail views of basket strainers 11 for a strainer funnel 1 of the present invention. FIGS. 23a and 23b are detail views of flat mesh basket strainers 60 for a strainer funnel 1 of the present invention. The flat mesh basket strainer is shown with handles 61 for supporting the strainer 60 by resting on the top edge of the bowl 3.

Numerous types of materials could be used to construct the components of the teachings of the present invention. For home uses, injected molded plastic might be the most cost effective. For commercial uses, there is a strong commercial bias towards stainless steel. Furthermore, different components could be constructed from different types of materials. For example, the bowl 3 may be made of plastic but the strainer 4 may be aluminum.

The teachings of present invention include an improved strainer funnel 5 for separating liquids from solids having, a bowl 3, a strainer 4 inside of the bowl 3 such that solids will not pass through the strainer 4 but liquids will, a funnel 5 in the bowl 3 such that the liquids passing through the strainer 4 pass through the funnel 5, wherein the improvement comprises: support means attached to the bowl 3 such that the bowl 3 is adequately supported on either a flat surface or on top of a container being used to collect the liquids passing through the funnel 5.

A further discovery of the present invention includes a method of separating liquids from solids. The new and improved method comprises: providing a bowl; positioning a strainer 4 inside of the bowl 3 such that solids will not pass through the strainer 4 but liquids will; providing a funnel 5 in the bowl 3 such that the liquids passing through the strainer 4 pass through the funnel; providing support means attached to the bowl 3 such that the bowl 3 is adequately supported on either a flat surface or on top of a container being used to collect the liquids passing through the funnel; positioning the bowl 3 such that the liquids passing through the funnel 5 are received in a selected receptacle; pouring a mixture of solids and liquids into the bowl; and allowing the liquid to flow through the strainer 4 and the funnel 5 such that it is received in the selected receptacle.

3. The strainer funnel 5 of claim 1 wherein the support means is a balancing disk 2 attached to the bowl 3 such that the funnel 5 extends through the disk and is level with a bottom of the disk and liquids may be collected by positioning the bowl 3 on the container for receiving the liquids so that liquids passing through the funnel 5 pour into the container.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

I claim:

1. A strainer funnel for separating liquids from solids comprising:
   a. a bowl;
   b. a strainer inside of the bowl and separating the bowl into an upper and lower portion such that a combination of liquids and solids can be placed in the upper portion of the bowl and liquids will flow through the strainer into the lower portion of the bowl and the solids will remain in the upper portion of the bowl;
   c. a funnel in the lower portion of the bowl such that the liquids in the lower portion of the bowl pass through the funnel; and
   d. support means attached to the bowl such that the bowl is adequately supported if placed on a flat surface and the funnel does not extend beyond the support means;
   e. the support means also supporting the bowl on top of a receptacle being used to collect the liquids passing through the funnel.

2. The strainer funnel of claim 1 wherein the support means are legs attached to the bowl, extending first in a horizontal direction and then in a vertical direction such that if the bowl is positioned on top of the receptacle the bowl will be supported on mouth of the receptacle by the portion of the legs extending in a horizontal direction and if the bowl is positioned on the flat surface the bowl will be supported on the flat surface by the portion of the legs extending in a vertical direction.

3. The strainer funnel of claim 1 wherein the support means is a balancing disk attached to the bowl such that the funnel extends through the disk.

4. The strainer funnel of claim 3 wherein the funnel is threaded and the balancing disk includes a threaded opening such that the disk is attached to the bowl by screwing the threaded opening of the disk onto the threaded funnel.

5. The strainer funnel of claim 3 wherein the balancing disk includes means for allowing air to escape as liquid flows through the funnel.

6. The strainer funnel of claim 5 wherein the means for allowing air to escape as liquid flows through the funnel are slots in the balancing disk and air can flow through the slots.

7. The strainer funnel of claim 5 wherein the means for allowing air to escape are ridges on the bottom of the disk such that air can flow between the ridges.

8. The strainer funnel of claim 3 wherein the balancing disk includes legs.

9. The strainer funnel of claim 1 wherein the strainer is removable from the bowl and the bowl includes means for supporting the strainer at a fixed level within the bowl.

10. The strainer funnel of claim 9 wherein the strainer includes a handle such that the solids can be removed from the bowl by lifting the strainer out of the bowl.

11. The Strainer funnel of claim 1 wherein the funnel includes a removable insert with a narrower funnel such that the narrower funnel does not extend beyond the funnel and when the insert is secured in the funnel liquid will flow through the narrower funnel in the insert.

12. The strainer funnel of claim 3 wherein the funnel does not extend beyond a bottom of the balancing disk.

13. An improved strainer funnel for separating liquids form solids having, a bowl, a strainer inside of the bowl such that solids will not pass through the strainer but liquids will, a funnel in the bowl such that the liquids passing through the strainer pass through the funnel, wherein the improvement comprises:
   a balancing disk attached to the bowl such that the bowl is adequately supported when placed on a flat surface and the bowl is adequately supported when placed on top of a receptacle being used to collect the liquids passing through the funnel;
   a removable insert within the funnel with a narrower funnel such that the narrower funnel does not extend beyond the funnel; and
   legs on the balancing disk such that the funnel does not extend beyond the legs on the balancing disk.

14. The method of separating liquids from solids comprising:
   a. providing a bowl;
   b. positioning a strainer inside of the bowl such that solids will not pass through the strainer but liquids will;
   c. providing a funnel in the bowl such that the liquids passing through the strainer pass through the funnel;
   d. providing support means attached to the bowl such that the bowl is adequately supported if placed on a flat surface;
   e. providing the support means such that the bowl is adequately supported if placed on top of a selected receptacle being used to collect the liquids passing through the funnel wherein the flat surface forms a bottom of the receptacle;
   f. positioning the bowl such that the liquids passing through the funnel are received in the selected receptacle;
   g. pouring a mixture of solids and liquids into the bowl; and
   h. allowing the liquid to flow through the strainer and the funnel such that it is received in the selected receptacle.

* * * * *